US012783647B2

(12) United States Patent
Liu et al.

(10) Patent No.: US 12,783,647 B2
(45) Date of Patent: Nov. 3, 2026

(54) INSTANT DETECTION OF A HOMOGLYPH ATTACK WHEN REVIEWING CODE IN AN AUGMENTED REALITY DISPLAY

(71) Applicant: INTERNATIONAL BUSINESS MACHINES CORPORATION, Armonk, NY (US)

(72) Inventors: Su Liu, Austin, TX (US); Boyi Tzen, Taipei (TW); Fan Yang, Beijing (CN); Saraswathi Sailaja Perumalla, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 366 days.

(21) Appl. No.: 17/932,649

(22) Filed: Sep. 15, 2022

(65) Prior Publication Data

US 2024/0095348 A1 Mar. 21, 2024

(51) Int. Cl.
*G06F 21/55* (2013.01)
*G06F 21/56* (2013.01)

(52) U.S. Cl.
CPC .......... *G06F 21/554* (2013.01); *G06F 21/552* (2013.01); *G06F 21/564* (2013.01)

(58) Field of Classification Search
CPC ..................................................... G06F 21/554
See application file for complete search history.

(56) References Cited

U.S. PATENT DOCUMENTS 9,118,704 B2 8/2015 Miller
10,862,907 B1 12/2020 Pon et al.
10,943,067 B1 * 3/2021 Brown .................. G06F 40/279
11,165,793 B2 11/2021 Mushtaq
11,310,270 B1 4/2022 Weber et al.
2008/0092242 A1 4/2008 Rowley
2010/0095378 A1 4/2010 Oliver et al.
2014/0115704 A1 4/2014 Miller
(Continued)

FOREIGN PATENT DOCUMENTS

WO 2019014527 A1 1/2019

OTHER PUBLICATIONS

Cetin et al., "SQL-Identifier injection attacks." 2019 IEEE Conference on Communications and Network Security (CNS). IEEE, 2019, 9 pp.

(Continued)

*Primary Examiner* — Simon P Kanaan
(74) *Attorney, Agent, or Firm* — Seed IP Law Group, LLP

(57) ABSTRACT

Provided are a computer program product, system, and method for detection of a homoglyph attack in code reviewed in an augmented reality display. A determination is made whether a line of code of source code includes a non-coding script character in a non-coding script that is a homoglyph of a coding script character in a coding script as indicated in a homoglyph pair. Valid statements in a computer language in which the source code is written are formed from characters in the coding script and not from characters in the non-coding script. In response to determining that the line of code includes the non-coding script character in the homoglyph pair, transmitting information on the homoglyph pair to cause the augmented reality display to render information on indication of the homoglyph.

20 Claims, 7 Drawing Sheets

(56) References Cited

U.S. PATENT DOCUMENTS

| | | | | |
|---|---|---|---|---|
| 2014/0184496 | A1* | 7/2014 | Gribetz | G06F 3/017 345/156 |
| 2018/0268130 | A1* | 9/2018 | Ghosh | G06F 21/53 |
| 2019/0019058 | A1 | 1/2019 | Woodbridge et al. | |
| 2020/0004989 | A1 | 1/2020 | Lockhart, III et al. | |
| 2020/0137110 | A1 | 4/2020 | Tyler et al. | |
| 2022/0030029 | A1 | 1/2022 | Eickhoff et al. | |

OTHER PUBLICATIONS

"CVE 2021 42694", Red Hat Summit, Oct. 31, 2021, 5pp., [online][retrieve Jul. 12, 2022] https://access.redhat.com/security/cve/cve-2021-42694.

Woodbridge, et al., "Detecting Homoglyph Attacks with a Siamese Neural Network", arXiv:1805.09738V1, May 24, 2018, 7pp.

Ginsberg et al., " Rapid Homoglyph Prediction and Detection", 2018 1st International Conference on Data Intelligence and Security, IEEE, 2018, 7pp.

"IBM Watson is AI for Smarter Business", IBM Corporation, 9pp. [online][reterieved Jul. 12, 2022] https://www.ibm.com/watson.

"NVD", NST, 2021, 5pp., [online][retrieved Jul. 12, 2022] https://nvd.nist.gov/vuln/detail/CVE-2021-42574.

Lee, et al., "Phishgan Data Augmentation and Identification", arXiv:2006.13742v3, IEEE 2020, 7pp.

Wikipedia, "Character (computing)", 5pp. [online][retrieved Jul. 12, 2022] https://en.wikipedia.org/wiki/Character (computing).

Wikipedia, "Glyph", 5pp. [online][retrieved Jul. 12, 2022] https://en.wikipedia.org/wiki/Glyph.

Wikipedia, "Grapheme", 4pp. [online][retrieved Jul. 12, 2022] https://en.wikipedia.org/wiki/Grapheme.

Wikipedia, "Idn homograph attack", 9pp. [online][retrieved Jul. 12, 2022] https://en.wikipedia.org/wiki/IDN_homograph_attack.

* cited by examiner

INSTANT DETECTION OF A HOMOGLYPH ATTACK WHEN REVIEWING CODE IN AN AUGMENTED REALITY DISPLAY

BACKGROUND OF THE INVENTION

1. Field of the Invention

The present invention relates to a computer program product, system, and method for instant detection of a homoglyph attack when reviewing code in an augmented reality display.

2. Description of the Related Art

A recent trojan source vulnerability has been discovered that has been a particular problem for open source code. A flaw concerns how Unicode standards are implemented in the context of development environments, which have specialized requirements for rendering text. Homoglyphs are different Unicode characters that, to the naked eye, look the same. An attacker could use homoglyphs to deceive a human reviewer by creating a malicious patch containing functions that look similar to standard library functions, such as the "print" function, but replace one character with a homoglyph. This function can then be defined in an upstream dependency to launch source code related attacks.

An example of a homoglyph attack would be a program statement that appears to use the Latin letter "a", but in fact is coded with the Unicode character for the Cyrillic letter "a". When the program statement with the homoglyph Cyrillic letter "a" is called, then it would address a malicious program statement, different from the non-malicious program statement invoked with the Latin letter "a".

Names of new added/modified variables, functions, and paths in source code may include issues associated with homoglyphs that appear identical or similar to each other. Homoglyphs can also be used to modify source code invisibly and perform targeted attacks.

There is a need in the art to provide improved techniques for preventing homoglyph attacks.

SUMMARY

Provided are a computer program product, system, and method for detection of a homoglyph attack in code reviewed in an augmented reality display. A determination is made whether a line of code of source code includes a non-coding script character in a non-coding script that is a homoglyph of a coding script character in a coding script as indicated in a homoglyph pair. Valid statements in a computer language in which the source code is written are formed from characters in the coding script and not from characters in the non-coding script. In response to determining that the line of code includes the non-coding script character in the homoglyph pair, transmitting information on the homoglyph pair to cause the augmented reality display to render information on indication of the homoglyph.

DETAILED DESCRIPTION

Described embodiments provide improvements to anti-virus computer technology to detect a particular type of trojan horse attack known as a homoglyph attack that uses characters from a Unicode set, that is not normally used to form the statements in the computer language in which the source code is written, also known as a non-coding script, that are homoglyphs of characters in a Unicode set used in the computer language in which the source code is written, or a coding script.

Described embodiments build a homoglyph pattern repository of homoglyph pairs of coding script characters used in the computer language in which the source code is written and non-coding script characters not used in the computer language. Upon a code reviewer viewing a line of code in an augmented reality display, an attack detector client may send a request to a homoglyph attack detector server to immediately determine, in real-time, whether any characters in the line of code being reviewed are non-coding script characters that are homoglyphs of coding script characters. Upon such detection, information may be rendered in the augmented reality display alerting the user of a homoglyph attack in the code they are reviewing and an option to replace the non-coding script character in the viewed line of code with a homoglyph coding script character. Replacing the non-coding script character in the line of source code will prevent any malicious routines from being invoked from a call to the program statement including the non-coding script character.

Figure 1:
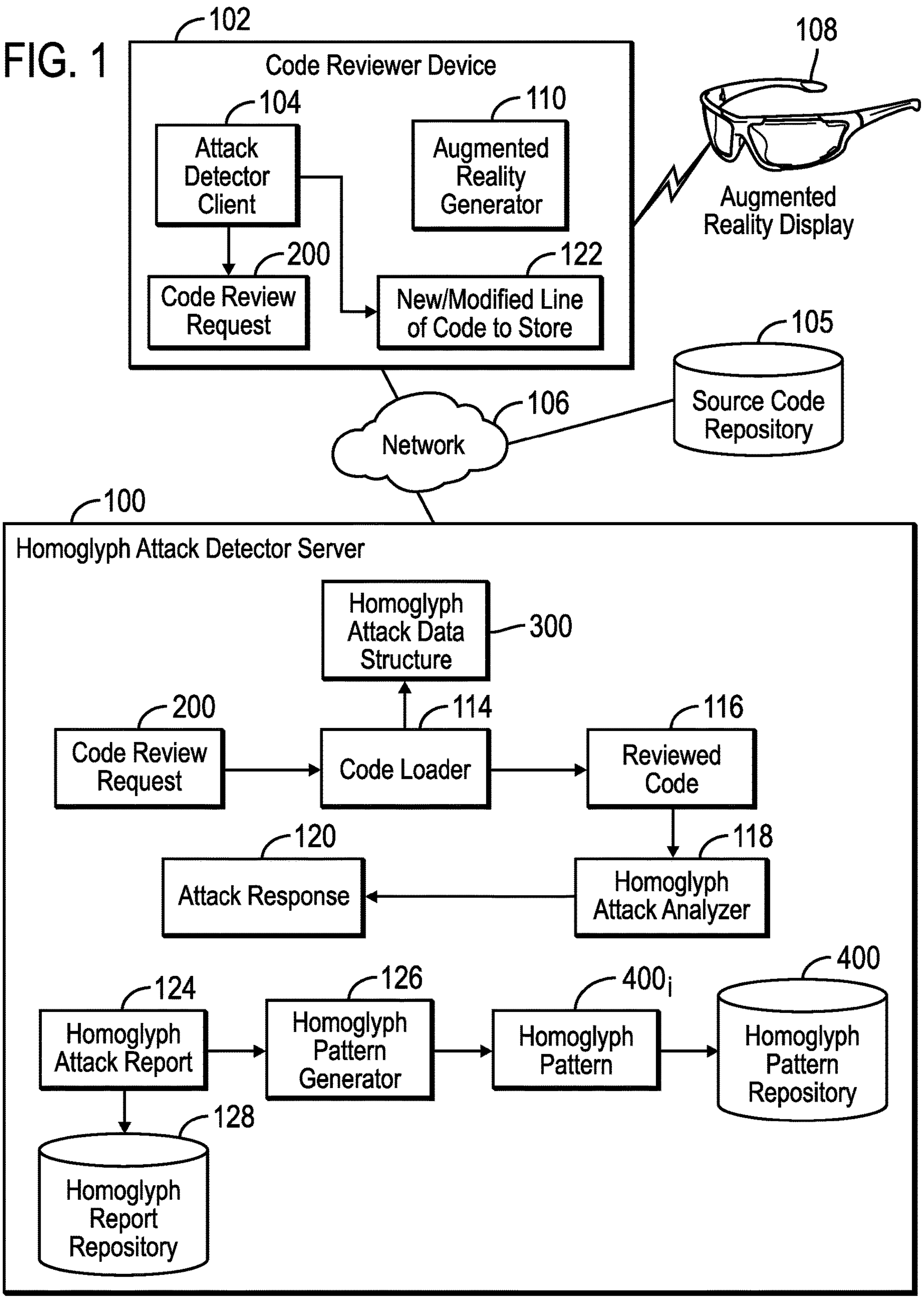
FIG. 1 illustrates an embodiment of a computing environment to provide instant analysis of homoglyph attacks in a line of code being reviewed.

FIG. 1 illustrates an embodiment of a homoglyph attack detector server 100 in communication with a code reviewer device 102 and a source code repository 105 over a network 106. The code reviewer device 102 is coupled to an augmented reality display 108, e.g., glasses, gaze tracking device, etc., such as via wireless communication methods. Alternatively, the code reviewer device 102 components may be implemented in the body of the augmented reality display 108. The code reviewer device 102 may include an attack detector client 104 to communicate a code review request 200, indicating a line of code on which the reviewer is gazing through the augmented reality display 108, to the homoglyph attack detector server 100 to determine if the line of code includes a character in a non-coding script that is a homoglyph of a character in a coding script. The coding script comprises a character set, such as the Latin Unicode character step, used to form statements in a computer language in which the source code is written. A non-coding script comprises characters that are not used in the computer language to form program statements, Cyrillic Unicode character set. Non-coding script characters may be used in program statements that appear to the human eye identical to a coding script character and that cause invocation of malicious code addressed by the program statement with the non-coding script character, e.g., a Cyrillic "a" instead of a Latin "a". The term "character" as used herein refers to a grapheme, character or glyph, and may be expressed in the Unicode character set or other character sets. The Unicode character set contains many strongly homoglyph characters, known as "confusable".

The code reviewer device 102 includes an augmented realty generator 110 to generate augmented reality representations of information on detected homoglyphs in a line of code the reviewer is gazing through the augmented reality display 108. In one embodiment, the augmented reality display 108 may comprise a type of computer vision glasses to render augmented reality images. The augmented reality display 108 may further comprise a gaze tracking device to receive a gazed image detected by eye tracking cameras that acquire the gazed image on which the tracked eye is fixed and information on coordinates of an axis of a line-of-sight, also referred to as sightline, visual axis, the user is viewing within the field of vision captured by the gaze tracking device tracking. Augmented reality (AR) smart glasses are wearable computer-capable glasses that generate digital information, such as three-dimensional images, text, animations, and videos, to overlay into the wearer's field of vision so the digital information is viewable along with real world scenes in the wearer's field of vision. Augmented reality is used to supplement information presented to users on items they are looking at, such as augmented reality controls to control items in the wearer's field of vision or information on locations in the field of vision.

The augmented reality glasses include a processor, display, sensors and input devices, and may include many of the components found in smartphones and tablet computers. Augmented reality rendering may be performed by optical projection systems, monitors, handheld devices, and display systems worn on the human body. A head-mounted display (HMD) is a display device worn on the forehead, such as a harness or helmet-mounted. HMDs place images of both the physical world and virtual objects over the user's field of view. Modern HMDs often employ sensors for six degrees of freedom monitoring that allow the system to align virtual information to the physical world and adjust accordingly with the user's head movements. The HMDs may also implement gesture controls for full virtual immersion.

Augmented reality displays may be rendered on devices resembling eyeglasses, and employ cameras to intercept real world view and re-display its augmented view through the eye pieces and devices in which AR imagery is projected through or reflected off the surfaces of the eyewear lens places. Other implementations of AR displays include a head-up display (HUD), which is a transparent display that presents data without requiring users to look away from their usual viewpoints. Augmented reality may include overlaying the information and registration and tracking between the superimposed perceptions, sensations, information, data, and images and some portion of the real world. Additional augmented reality implementations include contact lenses and virtual retinal display, where a display is scanned directly into the retina of a viewer's eye. EyeTap augmented reality devices capture rays of light that would otherwise pass through the center of the lens of the wearer's eye, and substitutes synthetic computer-controlled light for each ray of real light. Augmented reality devices may further use motion tracking technologies, including digital cameras and/or other optical sensors, accelerometers, GPS, gyroscopes, solid state compasses, radio-frequency identification (RFID).

In described embodiments, the display 108 comprises an augmented reality display. In further embodiments, the display 108 may generate mixed reality and virtual reality objects including mixed reality and virtual reality objects on homoglyphs. The term "augmented reality" as used herein may also include mixed reality and virtual reality objects.

The homoglyph attack detector server 100 includes a code loader 114 to process the code review request 200, generate a homoglyph attack data structure 300, and retrieve the line of code indicated in the code review request 200 from the source code repository 105 to load in a buffer as the reviewed code 116. A homoglyph attack analyzer 118 process the reviewed code 116 to determine whether the homoglyph pattern repository 400 includes a homoglyph patter 400$_i$ (FIG. 4) including a homoglyph pair including a non-coding script character in the reviewed code 116. The homoglyph attack analyzer 118 generates an attack response 120 to return to the attack detector client 104, indicating whether there is no homoglyph attack or information on a homoglyph attack in the line of code.

In one embodiment, the line of code the reviewer is viewing through the augmented reality display 108 comprises new code to add to a source code file in the source code repository 105. The attack detector client 104 may store the reviewed line of code 122 in the source code repository 105 if there is no homoglyph attack or after replacing the non-coding script character in the code with the coding script character in the homoglyph pair.

The homoglyph attack detector server 100 may further receive homoglyph attack reports 124, such as from an anti-virus reporting service, having information on a non-coding script character and coding script character in a homoglyph pair when the non-coding script character was used in a malicious attack. A homoglyph pattern generator 126 may process the homoglyph attack report 124 and generate a homoglyph pattern 400$_i$ indicating the malicious non-coding script character and store in the homoglyph pattern repository 400 to use to detect use of this malicious non-coding script character in source code being reviewed. The homoglyph report 124 may be stored in the homoglyph report repository 128 for future reference.

In certain embodiments, the homoglyph pattern repository 400 may include homoglyph patterns 400$_i$ of homoglyphs among the coding script and one or more non-coding scripts that exist, that may or may not have been used in homoglyph attacks. In such case, the homoglyph attack analyzer 118 may return information on homoglyphs in the reviewed code 116 to allow the code reviewer to correct by replacing the non-coding script character in the code with a coding script character. The code reviewer may replace the non-coding script character for homoglyph pairs not used in a homoglyph attack and for non-coding script character homoglyphs not reported to have been used in malicious attacks. In such case, the term "homoglyph attack" may include use of non-coding script character homoglyphs regardless of whether the non-coding script character homoglyph was identified in a homoglyph attack report 124.

The network 106 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIG. 1 between the components and objects in the homoglyph attack detector server 100 and the code reviewer device 102 represent a data flow between the components.

Generally, program modules, such as the program components 104, 110, 114, 118, 126 may comprise routines, programs, objects, components, logic, data structures, and so on that perform particular tasks or implement particular abstract data types. The program components and hardware devices of the computing devices 100 and 102 of FIG. 1 may be implemented in one or more computer systems, where if they are implemented in multiple computer systems, then the computer systems may communicate over a network.

The program components 104, 110, 114, 118, 126 may be accessed by a processor from memory to execute. Alternatively, some or all of the program components 104, 110, 114, 118, 126 may be implemented in separate hardware devices, such as Application Specific Integrated Circuit (ASIC) hardware devices.

The functions described as performed by the program 104, 110, 114, 118, 126 may be implemented as program code in fewer program modules than shown or implemented as program code throughout a greater number of program modules than shown.

The program components described as implemented in the homoglyph attack detector server 100 may be implemented in the code reviewer device 102 and/or augmented reality display 108.

The code reviewing device 102 may comprise a personal computing device, such as a laptop, desktop computer, tablet, smartphone, etc. The server 100 may comprise one or more server class computing devices, or other suitable computing devices.

Figure 2:
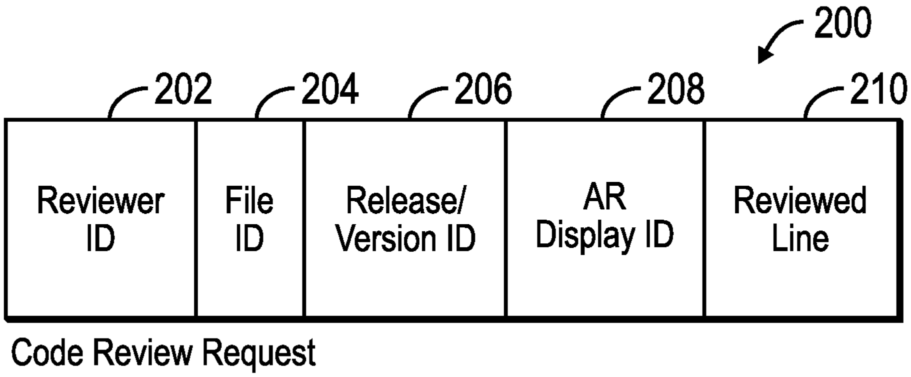
FIG. 2 illustrates an embodiment of a code review request to review code for a homoglyph attack.

FIG. 2 illustrates an embodiment of a code review request 200 generated by the attack detector client 104 and includes: a reviewer identifier (ID) 202 of the person viewing the source code through the augmented reality display 108; a file ID 204 including the source code being reviewed; a release/version ID 206 of the source code; and augmented reality (AR) display ID 208; and the reviewed line of code 210, such as line number.

Figure 3:
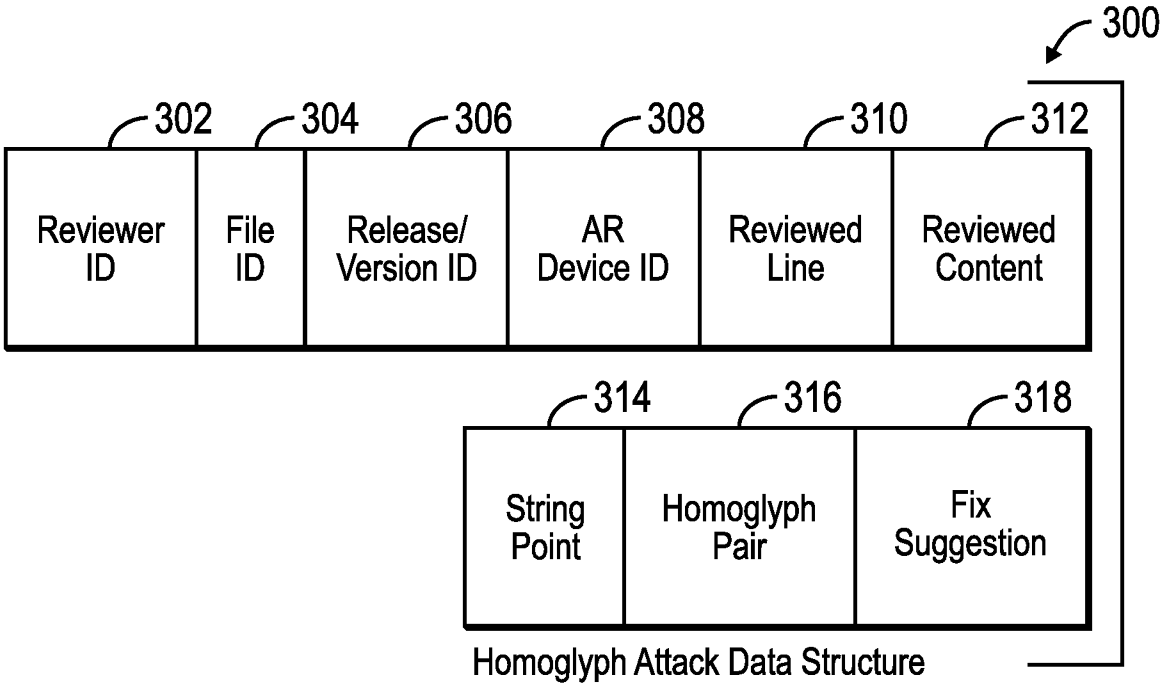
FIG. 3 illustrates an embodiment of a homoglyph attack data structure having information on a homoglyph attack in a line of code.

FIG. 3 illustrates an embodiment of a homoglyph attack data structure 300 generated by the code loader 114 from the code review request 200, and includes fields 302-310 that are derived from fields 202-210 of the received code review request 200 in FIG. 2. The data structure 300 further includes fields later updated by the homoglyph attack analyzer 118, and includes: the reviewed content 312, comprising the loaded reviewed code 116; a string point 314 identifying a location in the line of code where the non-coding script characters that are homoglyphs are located; one or more homoglyph pairs 316 comprising the located non-coding script character and a coding script character that are homoglyphs; and fix suggestions 318, such as to replace the non-coding script character with the coding script character in the homoglyph pair 316.

Figure 4:
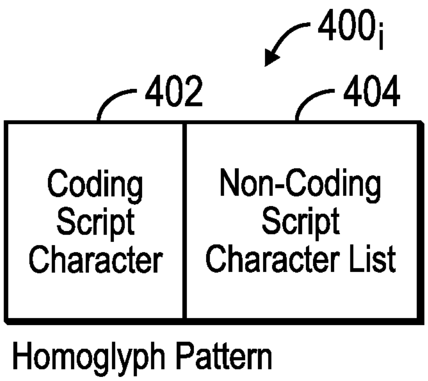
FIG. 4 illustrates an embodiment of a homoglyph pattern from a homoglyph attack maintained in a homoglyph pattern repository of previous homoglyph attacks.

FIG. 4 illustrates an embodiment of an instance of a homoglyph pattern 400$_i$ maintained in the homoglyph pattern repository 400, and includes a coding script character 402 and a non-coding script character list 404 of one or more non-coding script characters that are homoglyphs of the coding script character 402, and may or may not have been in identified homoglyph attacks from the homoglyph attack reports 124.

Figure 5:
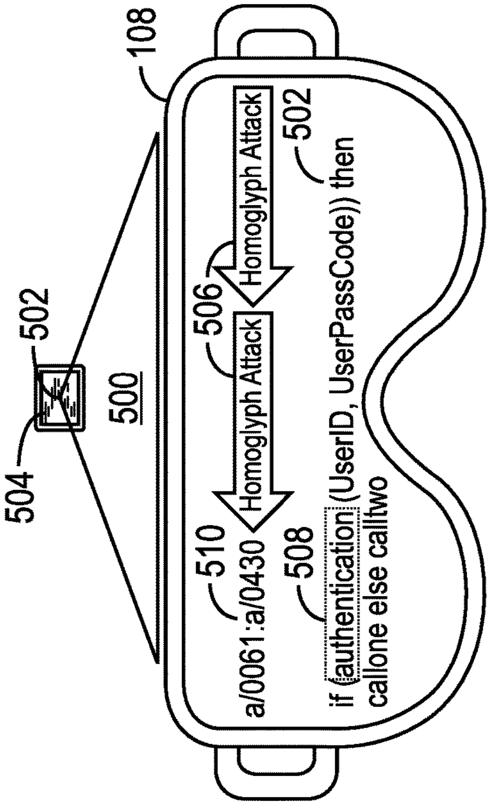
FIG. 5 illustrates an embodiment of an augmented reality display rendering augmented reality information on a homoglyph attack.

FIG. 5 illustrates an embodiment of the augmented reality display 108, showing a user line of vision 500, or field of view, directed to a line of code 502 on a computer display 504. The augmented reality display 108 is shown as rendering information on a homoglyph attack including homoglyph attack alerts 506, highlighting 508 the string in the viewed line of code 502 having the non-coding script homoglyph, and a homoglyph pair 510 of a coding script character, comprising the Unicode character for lower case Latin "a" of "a/0061", and the homoglyph non-coding script character, comprising the Unicode character for a lower case Cyrillic "a" of "a/0430".

Figure 6:
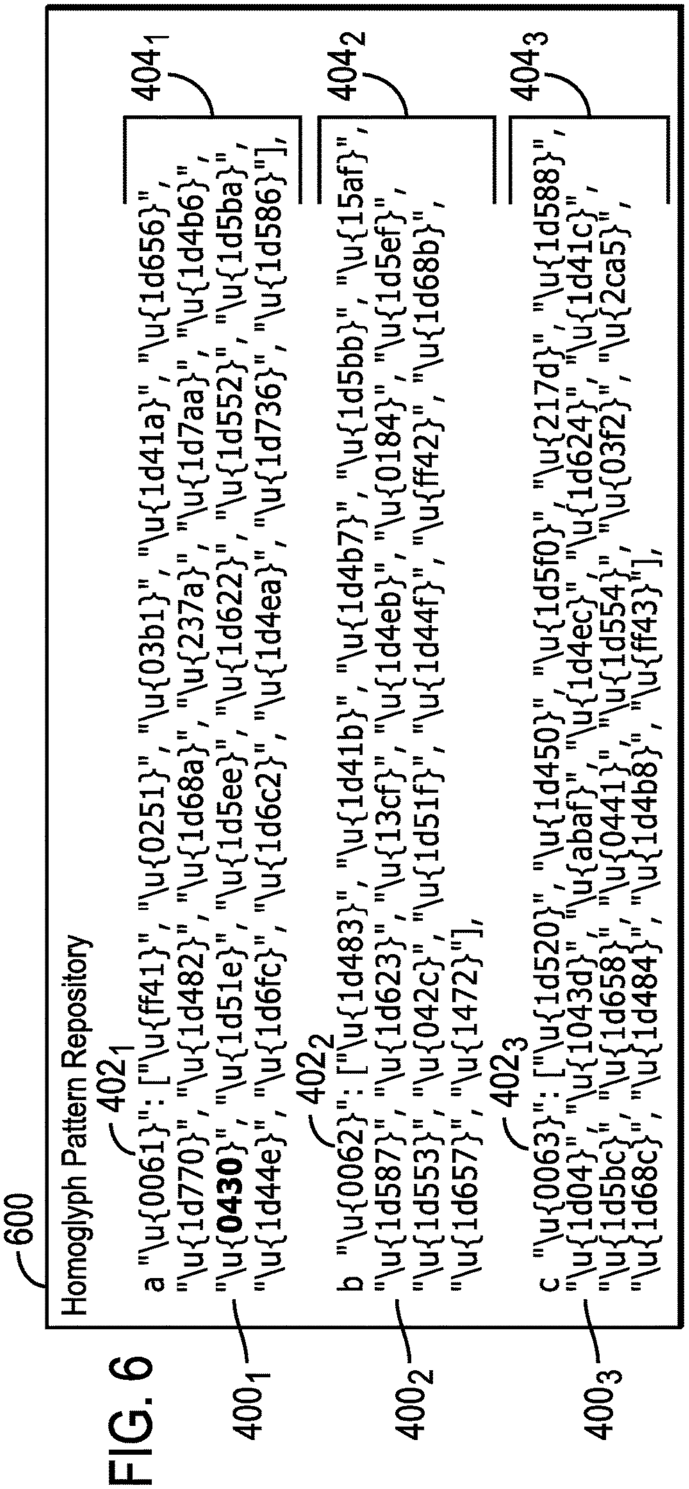
FIG. 6 illustrates an example of homoglyph patterns in a homoglyph pattern repository.

FIG. 6 illustrates an example of a homoglyph pattern repository 600 having three homoglyph patterns 400$_1$, 400$_2$, 400$_3$ with the coding script characters 402$_1$, 402$_2$, 402$_3$, and a list of non-coding script characters 404$_1$, 404$_2$, 404$_3$ that are homoglyphs of the coding script character 402$_1$, 402$_2$, 402$_3$, respectively.

Figure 7:
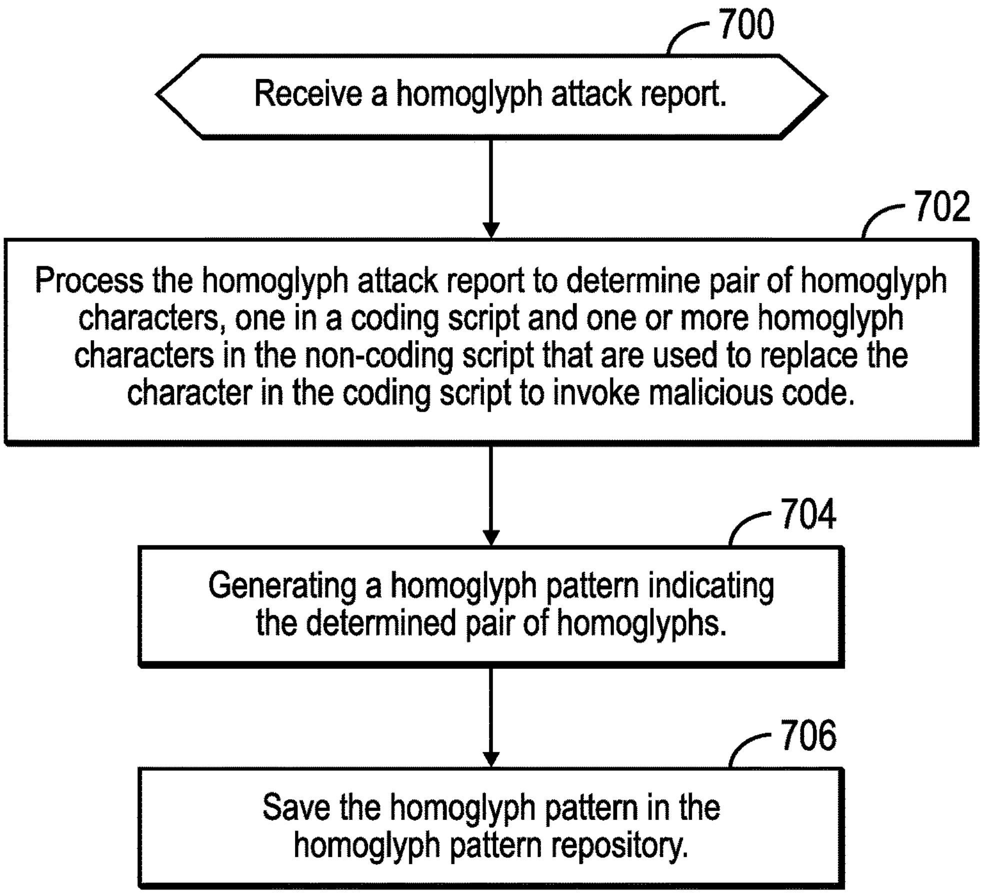
FIG. 7 illustrates an embodiment of operations to generate homoglyph patterns from a homoglyph attack report.

FIG. 7 illustrates an embodiment of operations performed by the homoglyph pattern generator 126 to process a homoglyph attack report 124, which may be received from an outside threat monitor service. Upon receiving (at block 700) a homoglyph attack report, the homoglyph pattern generator 126 processes (at block 702) the homoglyph attack report 124 to determine one or more pairs pair of homoglyph characters, one in a coding script and one or more homoglyph characters in the non-coding script that are used to replace the character in the coding script to invoke malicious code. The homoglyph pattern generator 126 may generate (at block 704) one or more homoglyph patters 400$_i$ indicating the determined pair of homoglyphs and store (at block 706) the generated homoglyph pattern 400$_i$ in a homoglyph pattern repository 400.

In one embodiment, the homoglyph pattern generator 126 may comprise a natural language processor (NLP) to recognize homoglyph pairs in the report 124 and output the homoglyph pairs as homoglyph patterns 400$_i$. With the embodiment of FIG. 7, the homoglyph pattern repository 400 is updated with most recent detected homoglyph pairs, which may or may not have been used in attacks to replace a coding script character with a homoglyph non-coding script character that may invoke malicious code.

Figure 8:
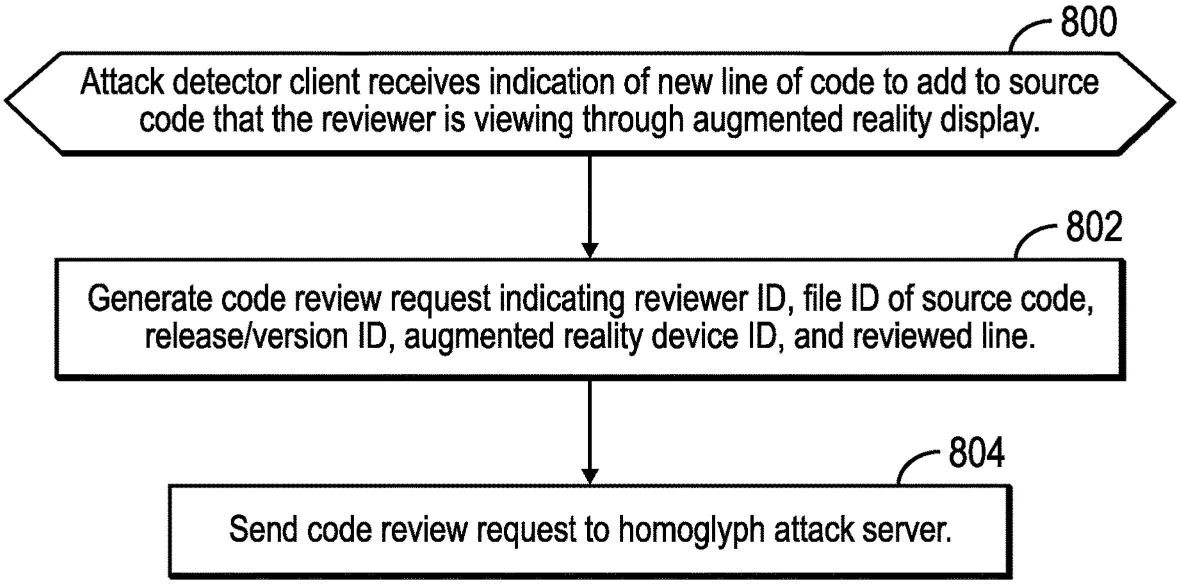
FIG. 8 illustrates an embodiment of operations for an attack detector client to generate a code review request for a line of code being viewed in an augmented reality display.

FIG. 8 illustrates an embodiment of operations performed by the attack detector client 104 to process a new line of code the code reviewer is viewing in the augmented reality display 108 to package and send to the homoglyph attack detector server 100. Upon receiving (at block 800) indication of new line of code 502 to add to source code, which the reviewer is viewing through augmented reality display 108, the attack detector client 104 generates (at block 802) a code review request 200 indicating reviewer ID 202, file ID of the source code 204, release/version ID 206, augmented reality display ID 208, and reviewed line 210. The generated code review request 200 is sent (at block 804) to the homoglyph attack detector server 100 to process for homoglyphs.

The embodiment of FIG. 8 provides real-time monitoring of code the reviewer is currently observing in the augmented reality display 108 to detect for non-coding script homoglyphs that the user is unable to detect with the naked eye.

Figure 9:
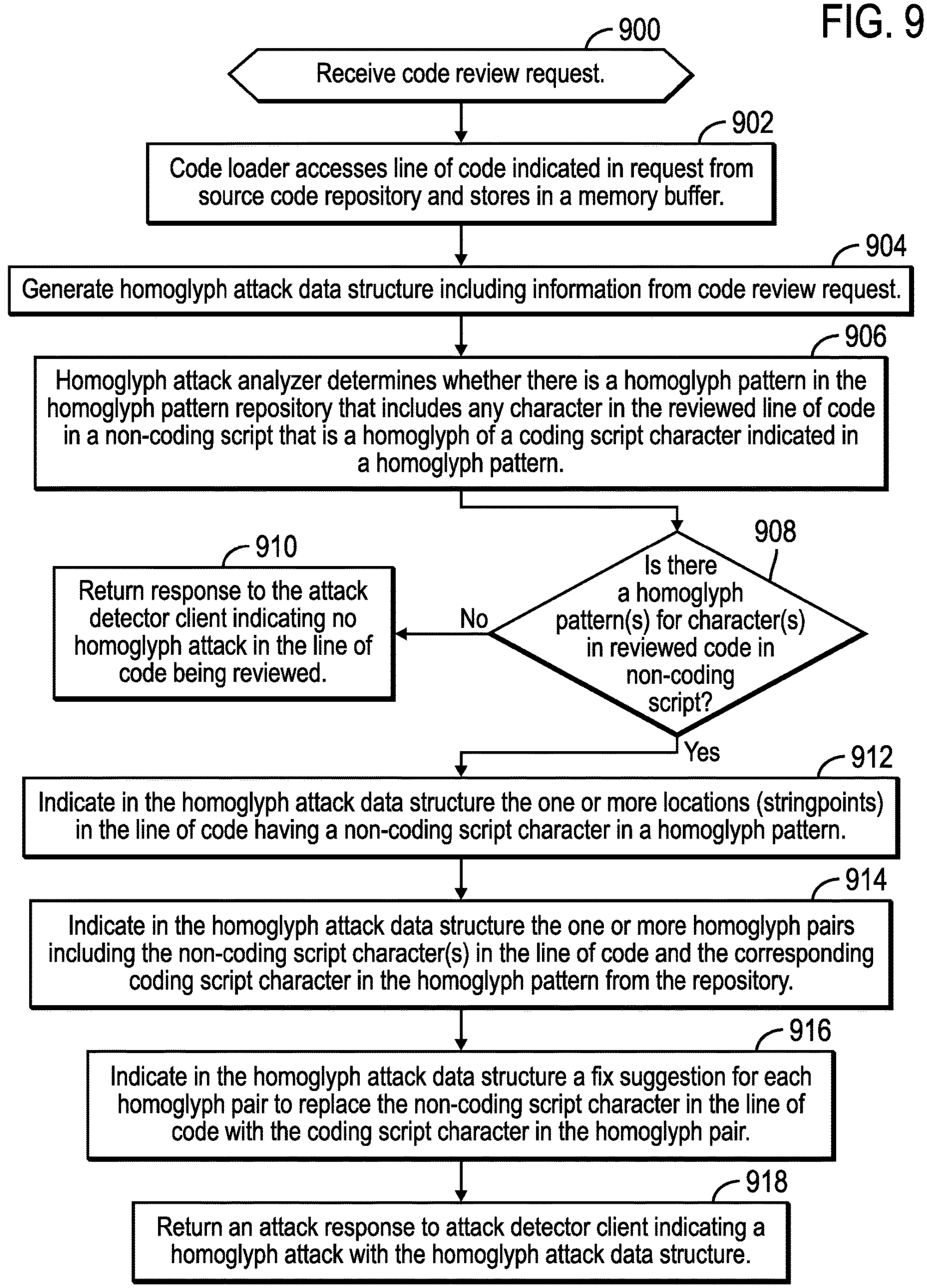
FIG. 9 illustrates an embodiment of operations to detect a homoglyph attack in a line of code in a code review request.

FIG. 9 illustrates an embodiment of operations performed by the code loader 114 and homoglyph attack analyzer 118 to process a code review request 200 to determine if the reviewed code 116 includes non-coding script characters that are homoglyphs and reply to the attack detector client 104. Upon receiving (at block 900) the code review request 200, the code loader 114 accesses (at block 902) the reviewed code 116, indicated in field 210 of the code review request 200, from the source code repository 105 and stores in a memory buffer. The code loader 114 generates (at block 904) a homoglyph attack data structure 300 including information from the code review request 200, including fields 202-210 in the code review request 200 in fields 302-310 of the data structure 300. The homoglyph attack analyzer 118 determines (at block 906) whether there is a homoglyph pattern $400_i$ in the homoglyph pattern repository 400 that includes any character in the line of reviewed code 116 in a non-coding script 404 that is a homoglyph of a coding script character 402 indicated in a homoglyph pattern $400_i$.

If (at block 908) there are no homoglyph pattern(s) $400_i$ for characters in the reviewed code 116 in a non-coding script identified in field 404 of a homoglyph pattern, then the homoglyph attack analyzer 118 returns (at block 910) a response to the attack detector client 104 indicating no homoglyph attack in the line of code being reviewed. If (at block 908) there is a homoglyph pattern $400_i$ including a character in the reviewed code 116, then the homoglyph attack analyzer 118 indicates (at block 912) in the homoglyph attack data structure 300 the string points 314, or one or more locations/positions, in the line of code 116, having a non-coding script character in a homoglyph pattern $400_i$. The homoglyph attack analyzer 118 indicates (at block 914) in the homoglyph attack data structure 300 the one or more homoglyph pairs 316 including the non-coding script character(s) in the line of code 116 and the corresponding homoglyph coding script character(s) 402 in the homoglyph pattern $400_i$ from the repository 400. The homoglyph attack analyzer 118 indicates (at block 916) in the homoglyph attack data structure 300 a fix suggestion 318 for each homoglyph pair 316 to replace the non-coding script character in the reviewed code 116 with the homoglyph coding script character in the homoglyph pair 316. An attack response 120 is returned (at block 918) to the attack detector client 104 indicating a homoglyph attack with the homoglyph attack data structure 300, or other information indicating the non-coding script characters in the string point 314 locations in the line of code 310 to replace with homoglyph coding script characters.

With the embodiment of FIG. 9, a line of code the reviewer is currently reviewing is processed in real-time to determine whether there are non-coding script characters that are homoglyphs of coding script characters and that are indicated in a homoglyph pattern in a repository 400 of homoglyph non-coding script characters used in homoglyph attacks. Additionally, the homoglyph pattern repository 400 may include homoglyph patterns of homoglyph pairs that have not been used in a recognized attack.

Figure 10:
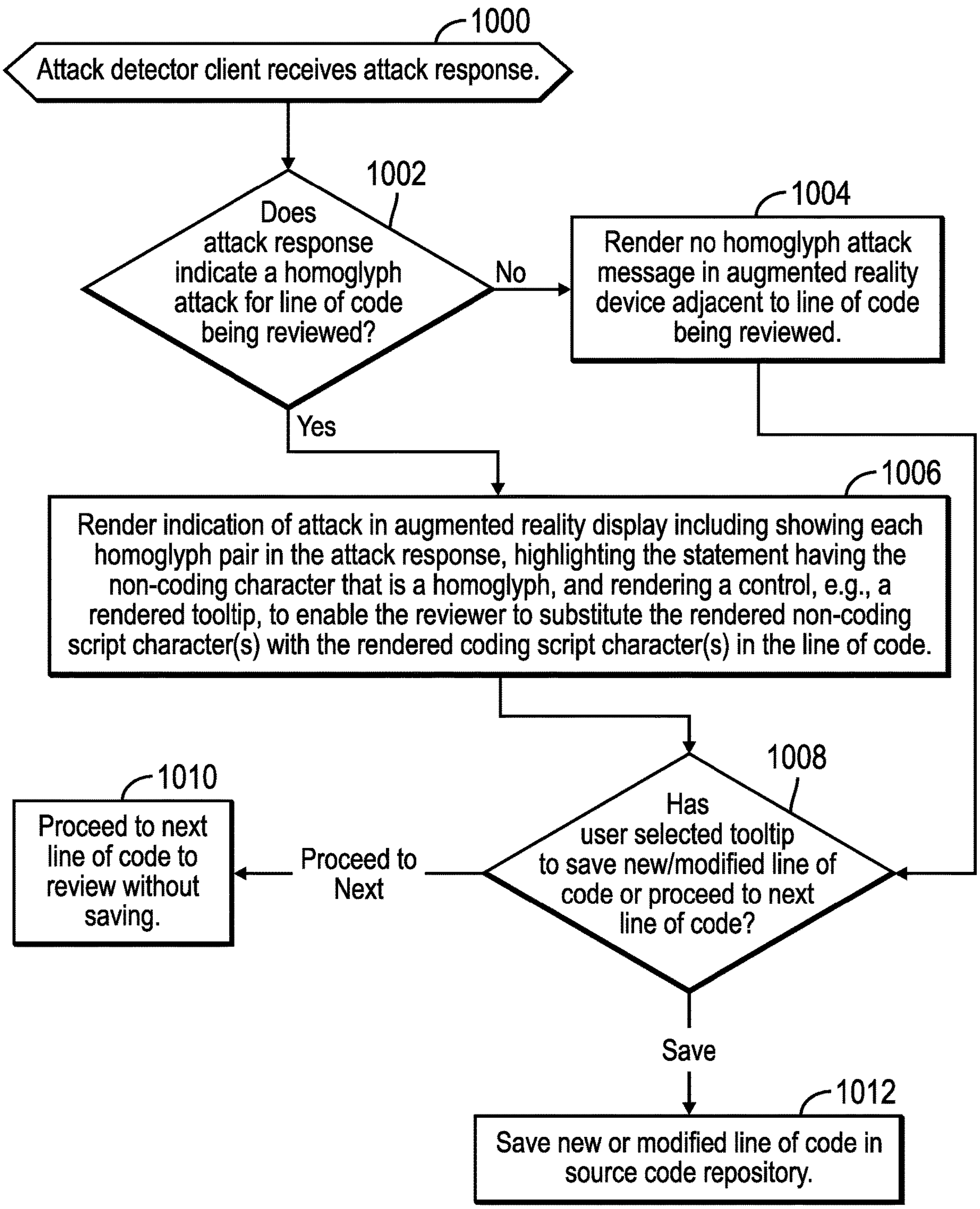
FIG. 10 illustrates an embodiment of operations to generate information on a homoglyph attack of a line of code viewed in an augmented reality display.

FIG. 10 illustrates an embodiment of operations performed by the attack detector client 104 to process an attack response 120 and communicate with the augmented reality generator 110 to render information on a homoglyph attack in the augmented reality display 108. Upon receiving (at block 1000) an attack response 120 from the homoglyph attack detector server 100, the attack detector client 104 determines (at block 1002) whether the attack response 120 indicates a homoglyph attack for the line of code 502 being reviewed by the reviewer in the augmented reality display 108. If (at block 1002) a homoglyph attack is not indicated, then the attack detector client 104 interfaces with the augmented reality generator 110 to render (at block 1004) indication of no homoglyph attack message in augmented reality display 108 adjacent to line of code being reviewed.

If (at block 1002) a homoglyph attack is indicated, with information on affected line of code in attack response 120, the attack detector client 104 interfaces with the augmented reality generator 110 to render (at block 1006) indication of homoglyph attack 506 (FIG. 5) in augmented reality display 108, including rendering each homoglyph pair 510 in the attack response 120, highlighting 508 the statement 502 including the non-coding character that is a homoglyph, and including a control, e.g., a rendered tooltip, to enable the reviewer to substitute the rendered non-coding script character(s), e.g., "a/0430", in the line of code 502 with the rendered coding script character(s) in the homoglyph pair 510, e.g., "a/0061".

If (at block 1008) the user has selected the tooltip or control to not save the line of code, then the user (at block 1010) may proceed to review the next line of code without saving the previously viewed new line of code in the source code, and proceed to block 900 in FIG. 9 to process the next new line of code being viewed. If (at block 1008) the user has selected the tooltip or control to save a modified line of code, then the new or modified line of code 122 is saved (at block 1012) in the source code repository 105.

With the embodiment of FIG. 10, the user may, through the representations of a homoglyph attack rendered in the augmented reality display 108, replace the non-coding script character homoglyph with the corresponding coding script character to avoid the possibility of calling a malicious routine addressed by the statement with the non-coding script character that is flagged as a homoglyph.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code 1101 involved in performing the inventive methods, such as an instant homoglyph attack detector client 1102 for the code review device 102 components or an instant homoglyph attach detector server 1103 for the server 100 components. The instant homoglyph attack detector client 1102 may include the attack detector client 104 and the augmented reality generator 110 as shown in FIG. 1 and the instant homoglyph attack detector server may include the code loader 114, the homoglyph attack analyzer 118, the homoglyph pattern generator 126 as shown in FIG. 1.

In addition to block 1101, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1101, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

Figure 11:
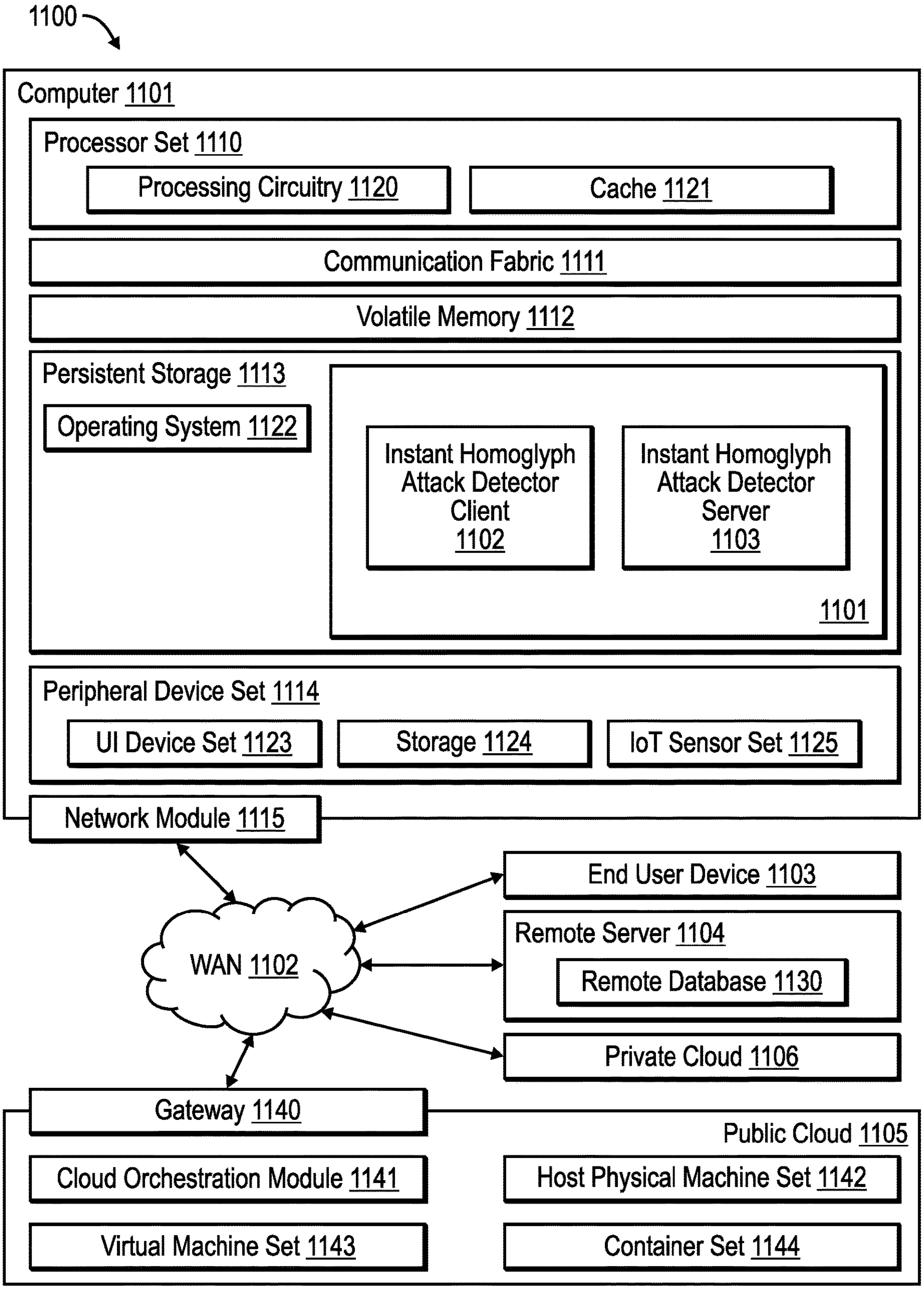
FIG. 11 illustrates a computing environment in which the components of FIG. 1 may be implemented.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1101 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for detecting homoglyphs in computer code reviewed through an augmented reality display, the computer program product comprising a computer readable storage medium having computer readable program code embodied therein that is executable to perform operations, the operations comprising:

providing homoglyph pairs, wherein each of a plurality of the homoglyph pairs includes a coding script character in a coding script in a computer language in which source code is written and a non-coding script character in a non-coding script not used in the computer language that comprises a homoglyph of the coding script character;

determining whether a line of code of source code includes a non-coding script character in the non-coding script indicated in a homoglyph pair of the homoglyph pairs, wherein valid statements in a computer language in which the source code is written are formed from characters in the coding script and not from characters in the non-coding script; and in response to determining that the line of code includes the non-coding script character indicated in the homoglyph pair, transmitting information on the homoglyph pair to cause the augmented reality display to render information on indication of the homoglyph.

2. The computer program product of claim 1, wherein the information to render in the augmented reality display on the homoglyph includes:

the non-coding script character and the coding script character in the homoglyph pair; and an indicator of a homoglyph attack.

3. The computer program product of claim 1, wherein the information to render in the augmented reality display on the homoglyph includes a highlighting of a program statement in the line of code including the non-coding script character in the homoglyph pair.

4. The computer program product of claim 1, wherein the line of code comprises new code to add to the source code, wherein the operations further comprise:

storing the line of code in a source code repository in response to determining that the line of code does not include a non-coding script character that is a homoglyph of a coding script character in the homoglyph pair.

5. The computer program product of claim 1, wherein the transmitting information on the homoglyph pair causes the augmented reality display to render controls to enable a reviewer to replace the non-coding script character in the line of code with the coding script character in the homoglyph pair to form a modified line of code and to store the modified line of code in a source code repository.

6. The computer program product of claim 1, wherein the operations further comprise:

analyzing a homoglyph attack report to determine an indicated homoglyph pair of a non-coding script character and a coding script character where the non-coding script character was used in a homoglyph attack; and generating a homoglyph pattern in a homoglyph pattern repository to include the homoglyph pair determined from the homoglyph attack report, wherein the determining whether the line of code includes a non-coding script character that is a coding script character in a homoglyph pair comprises determining whether a homoglyph pattern in a homoglyph pattern repository includes the homoglyph pair indicating the non-coding script character in the line of code.

7. The computer program product of claim 1, wherein the operations further comprise:

generating a data structure in response to receiving the line of code indicating a reviewer identifier, a file identifier including the line of code, a version identifier indicating a version of the source code, the line of code being reviewed, a location in the line of code including the non-coding script character, and a homoglyph pair indicating the non-coding script and the coding script character in response to determining that the non-coding script character is a homoglyph of the coding script character, and a fix suggestion to replace the non-coding script character with the coding script character in the homoglyph pair.

8. A system for detecting homoglyphs in computer code reviewed through an augmented reality display, comprising:

a processor; and a computer readable storage medium having computer readable program code embodied therein that when executed by the processor performs operations, the operations comprising:

providing homoglyph pairs, wherein each of a plurality of the homoglyph pairs includes a coding script character in a coding script in a computer language in which source code is written and a non-coding script character in a non-coding script not used in the computer language that comprises a homoglyph of the coding script character;

determining whether a line of code of source code includes a non-coding script character in the non-coding script indicated in a homoglyph pair of the homoglyph pairs, wherein valid statements in a computer language in which the source code is written are formed from characters in the coding script and not from characters in the non-coding script; and in response to determining that the line of code includes the non-coding script character indicated in the homoglyph pair, transmitting information on the homoglyph pair to cause the augmented reality display to render information on indication of the homoglyph.

9. The system of claim 8, wherein the information to render in the augmented reality display on the homoglyph includes:

the non-coding script character and the coding script character in the homoglyph pair; and an indicator of a homoglyph attack.

10. The system of claim 8, wherein the information to render in the augmented reality display on the homoglyph includes a highlighting of a program statement in the line of code including the non-coding script character in the homoglyph pair.

11. The system of claim 8, wherein the line of code comprises new code to add to the source code, wherein the operations further comprise:

storing the line of code in a source code repository in response to determining that the line of code does not include a non-coding script character that is a homoglyph of a coding script character in the homoglyph pair.

12. The system of claim 8, wherein the transmitting information on the homoglyph pair causes the augmented reality display to render controls to enable a reviewer to replace the non-coding script character in the line of code with the coding script character in the homoglyph pair to form a modified line of code and to store the modified line of code in a source code repository.

13. The system of claim 8, wherein the operations further comprise:

analyzing a homoglyph attack report to determine an indicated homoglyph pair of a non-coding script character and a coding script character where the non-coding script character was used in a homoglyph attack; and generating a homoglyph pattern in a homoglyph pattern repository to include the homoglyph pair determined from the homoglyph attack report, wherein the determining whether the line of code includes a non-coding script character that is a coding script character in a homoglyph pair comprises determining whether a homoglyph pattern in a homoglyph pattern repository includes the homoglyph pair indicating the non-coding script character in the line of code.

14. The system of claim 8, wherein the operations further comprise:

generating a data structure in response to receiving the line of code indicating a reviewer identifier, a file identifier including the line of code, a version identifier indicating a version of the source code, the line of code being reviewed, a location in the line of code including the non-coding script character, and a homoglyph pair indicating the non-coding script and the coding script character in response to determining that the non-coding script character is a homoglyph of the coding script character, and a fix suggestion to replace the non-coding script character with the coding script character in the homoglyph pair.

15. A method for detecting homoglyphs in computer code reviewed through an augmented reality display, comprising:

providing homoglyph pairs, wherein each of a plurality of the homoglyph pairs includes a coding script character in a coding script in a computer language in which source code is written and a non-coding script character in a non-coding script not used in the computer language that comprises a homoglyph of the coding script character;

determining whether a line of code of source code includes a non-coding script character in the non-coding script indicated in a homoglyph pair of the homoglyph pairs, wherein valid statements in a computer language in which the source code is written are formed from characters in the coding script and not from characters in the non-coding script; and in response to determining that the line of code includes the non-coding script character indicated in the homoglyph pair, transmitting information on the homoglyph pair to cause the augmented reality display to render information on indication of the homoglyph.

16. The method of claim 15, wherein the information to render in the augmented reality display on the homoglyph includes:

the non-coding script character and the coding script character in the homoglyph pair; and an indicator of a homoglyph attack.

17. The method of claim 15, wherein the information to render in the augmented reality display on the homoglyph includes a highlighting of a program statement in the line of code including the non-coding script character in the homoglyph pair.

18. The method of claim 15, wherein the transmitting information on the homoglyph pair causes the augmented reality display to render controls to enable a reviewer to replace the non-coding script character in the line of code with the coding script character in the homoglyph pair to form a modified line of code and to store the modified line of code in a source code repository.

19. The method of claim 15, further comprising:

analyzing a homoglyph attack report to determine an indicated homoglyph pair of a non-coding script character and a coding script character where the non-coding script character was used in a homoglyph attack; and generating a homoglyph pattern in a homoglyph pattern repository to include the homoglyph pair determined from the homoglyph attack report, wherein the determining whether the line of code includes a non-coding script character that is a coding script character in a homoglyph pair comprises determining whether a homoglyph pattern in a homoglyph pattern repository includes the homoglyph pair indicating the non-coding script character in the line of code.

20. The method of claim 15, further comprising:

generating a data structure in response to receiving the line of code indicating a reviewer identifier, a file identifier including the line of code, a version identifier indicating a version of the source code, the line of code being reviewed, a location in the line of code including the non-coding script character, and a homoglyph pair indicating the non-coding script and the coding script character in response to determining that the non-coding script character is a homoglyph of the coding script character, and a fix suggestion to replace the non-coding script character with the coding script character in the homoglyph pair.

* * * * *